(No Model.) 2 Sheets—Sheet 1.
H. WILLIAMS & T. L. FISHER.
ROTARY STEAM ENGINE.
No. 518,299. Patented Apr. 17, 1894.
Fig. 1.
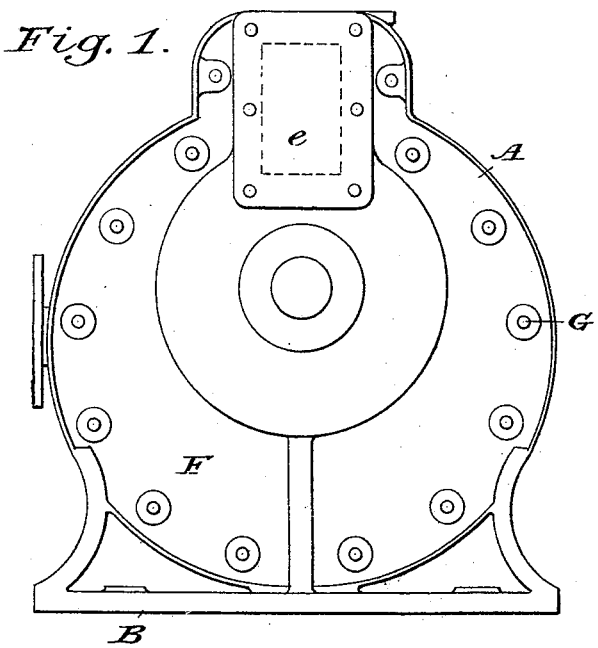
Fig. 13.
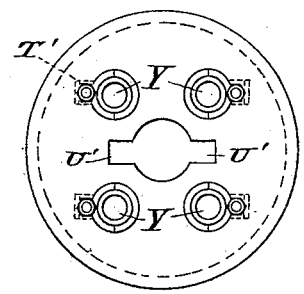
Fig. 2.
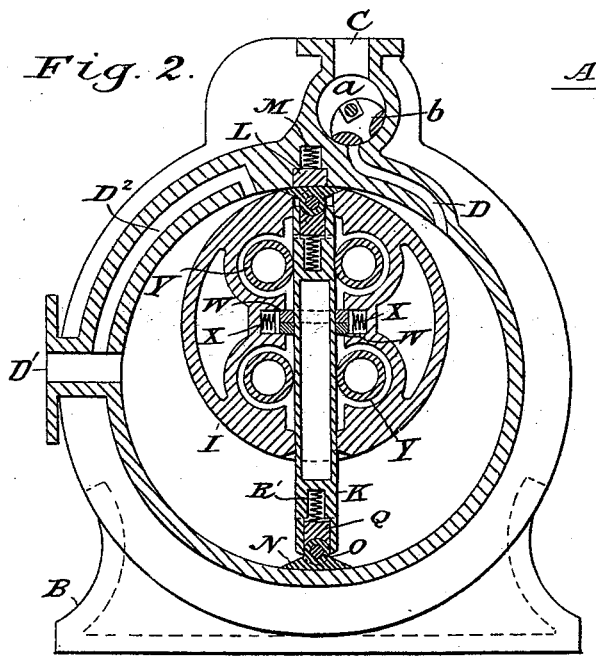
Fig. 16.
Fig. 14.
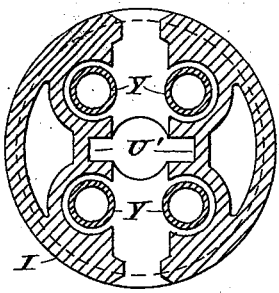
WITNESSES:
E. B. Bolton
H. van Oldenneel
INVENTORS
Harry Williams
Thomas Langston Fisher
BY
Richards & Co.
ATTORNEYS (No Model.) 2 Sheets—Sheet 2.
H. WILLIAMS & T. L. FISHER.
ROTARY STEAM ENGINE.
No. 518,299. Patented Apr. 17, 1894.
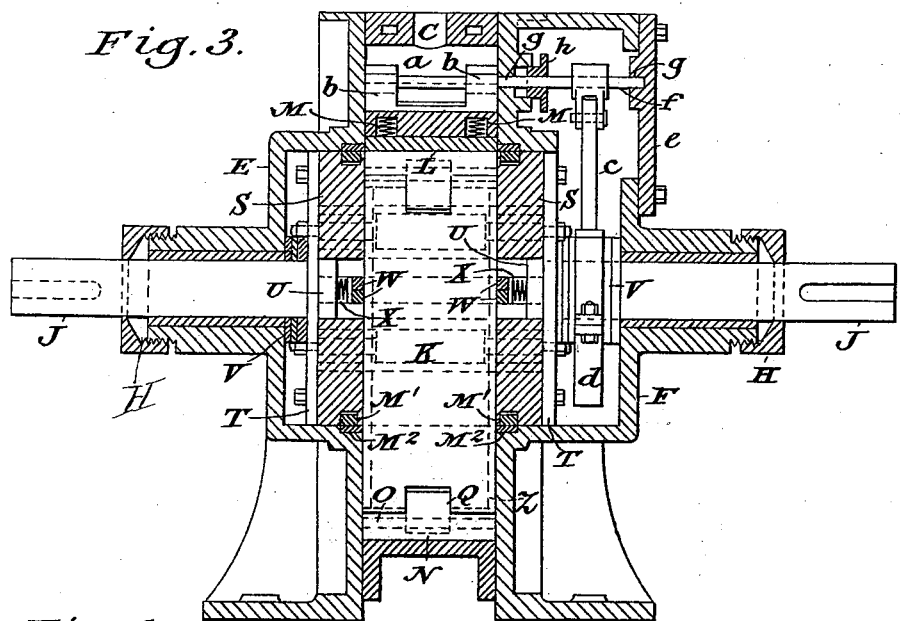
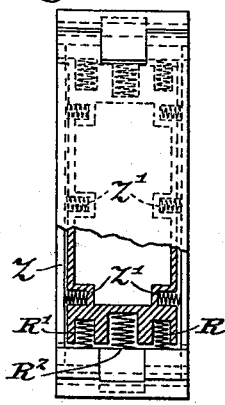
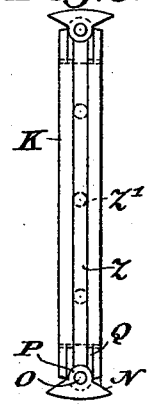
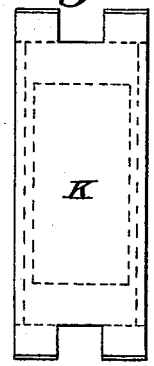
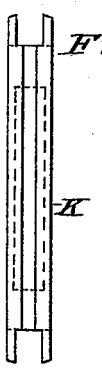
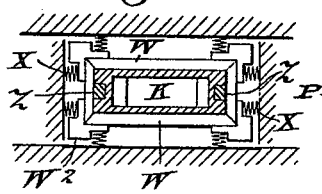
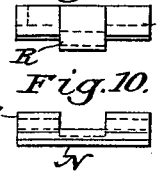
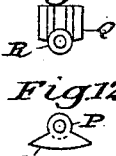
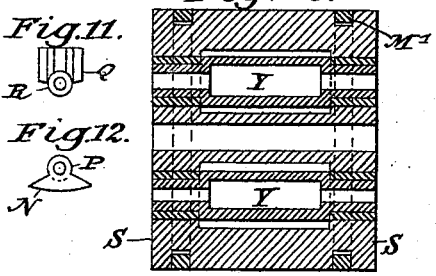
WITNESSES:
INVENTORS
Harry Williams
Thomas Langston Fisher
BY
Richards &Co.
ATTORNEYS

UNITED STATES PATENT OFFICE.

HARRY WILLIAMS, OF RICHMOND, AND THOMAS LANGSTON FISHER, OF HAWTHORN, VICTORIA.

ROTARY STEAM-ENGINE.

SPECIFICATION forming part of Letters Patent No. 518,299, dated April 17, 1894.

Application filed October 7, 1893. Serial No. 487,466. (No model.) Patented in Victoria February 2, 1892, No. 9,430, and in England April 25, 1892, No. 7,767.

*To all whom it may concern:*

Be it known that we, HARRY WILLIAMS, residing at 134 Somerset Street, Richmond, and THOMAS LANGSTON FISHER, residing at Lennox Street, Hawthorn, Colony of Victoria, subjects of the Queen of Great Britain and Ireland, have invented a certain new and useful invention of an Improved Rotary Steam-Engine, (for which we have obtained a patent in Great Britain, No. 7,767, dated April 25, 1892, and in Victoria, No. 9,430, dated February 2, 1892,) of which the following is a specification.

Our present object is to provide a rotary steam engine in which, first, the form or shape of the cylinder and the arrangement of a piston with a drum that will admit during the expansive working of one induction of steam, of a second induction prior to the opening of the exhaust; secondly, the arrangement of the piston will permit of two pressure chambers to be quickly increased and diminished in capacity so that the maximum degree of work may be obtained from the steam before it exhausts from the engine; thirdly, the construction and arrangement of said piston and its drum so that both ends of the former will be in constant contact with the bore of the engine cylinder; fourthly, the arrangement of the drum eccentrically within the cylinder whereby the piston may have a considerable leverage and an equal balance during each revolution. But in order that our invention may be better understood we will now refer to the accompanying sheet of drawings.

Figure 1 is an end elevation of our engine. Fig. 2 is an end vertical section through the cylinder, sliding piston, piston, drum and an oscillating steam valve. Fig. 3 is a slide vertical section through Fig. 1. Fig. 4 is a side elevation of the sliding piston which is shown partly in section. Fig. 5 represents a full end elevation of the sliding piston shown at Fig. 4. Fig. 6 is a side elevation of the flat sliding piston without the hinged blocks and intermediate pieces at each end. Fig. 7 is an end elevation of the piston shown at Fig. 6. Fig. 8 is a sectional plan of piston showing its sides and also the front and rear faces provided with steam-tight gunmetal strips and steel springs. Figs. 9 and 10 are elevations of the intermediate pieces which are fitted to each end of the sliding piston to carry the hinged blocks. Fig. 11 represents an end elevation of one of said intermediate pieces of the sliding piston. Fig. 12 is an end elevation of one of the blocks hinged upon the intermediate piece of the sliding piston. Fig. 13 is an end elevation of the piston drum illustrating the bearings which carry the antifriction rollers. Fig. 14 is an end section of the piston drum and antifriction rollers and Fig. 15 represents a sectional elevation of Fig. 14. Fig. 16 is a diagram illustrating the various points from which is lined out the contour of the cylinder bore.

The drawings are prepared to a scale of two inches which equal one foot.

Like letters of reference represent like parts in all the views.

In the drawings (A) is the cylinder carried by a suitable bed (B).

(C) is the steam inlet communicating with the passage (D). Said inlet (C) is situated at right angles to the exhaust (D'). With said exhaust (D') communicates the passage (D²). The cylinder aforesaid is provided with two end covers (E) and (F) which are secured to the faced cylinder ends by means of a suitable number of stud bolts similar to (G).

(H) and (H) are two shaft glands fitted upon the covers (E) and (F) to prevent any leakage of water or steam which may at any time occur through the cylinder. The cylinder aforesaid has a peculiarly formed bore as hereinafter described within which is eccentrically arranged a drum termed the "piston drum."

(J) and (J) are two shafts between which is interposed the piston drum hereinafter described.

(K) is the piston which slides inwardly and outwardly at right angles to the axis of said drum.

(L) is the aforesaid gunmetal strip arranged in a longitudinal channel formed in the cylinder (A) as shown at Figs. 2 and 3.

(M) and (M) represent two steel springs seated in two recesses formed above the longitudinal recess which contains the transverse strip (L). Said strip forms a joint to prevent the steam passing between the contact surfaces of the drum and the cylinder.

(M') and (M') are two piston rings sprung in grooves formed in the circumference of the piston drum as illustrated in Figs. 3, and 15. (M$^2$) and (M$^2$) are similar rings sprung into the before described cylinder covers (E) and (F) as at Fig. 3.

(N) represents the blocks which are hinged one to each end of the piston body as at Figs. 2, 3, 10, and 12. Each block is made with two tubular eyes P and P which carry a pin similar to O. A space is left between said eyes to receive the tongue (R) projected from the intermediate piece as shown in Figs. 9 and 10. This tongue (R) also forms shoulders upon the intermediate piece (Q) to fit into the cross-shaped gulleted ends of the flat piston body (K). In each end of said piston body (K) are formed three recesses in which are arranged three spiral springs similar to (R') (R') and (R$^2$) for the purpose of keeping the hinged blocks (N) steam-tight with the contour of the cylinder.

(S) represents the piston drum to the ends of which are bolted the flanged disks (T) and (T) suitably secured to the shafts (J) and (J). Said disks and piston drum (S) are secured together by means of four stud bolts similar to (T') as in Fig. 13.

(U) and (U) are two dowels formed upon the inner faces of the flanges or disks (T) to project into the cylindrical recesses provided one in each end of the piston drum and bear upon the springs (X) hereinafter described as at Fig. 3 and between each disk (T) and the shaft bearings are placed the collars (V) and (V).

Within suitable recesses formed in the drum shown at Figs. 2, 13, 14, and 15, there are arranged four anti-friction rollers similar to (Y) between each pair of which slides the aforesaid piston (K). Said rollers are made hollow and their ends are reduced to work in metal bearings or bushes suitably secured in the piston drum.

For the purpose of rendering the sliding piston (K) steam-tight within the drum (S) there are four metal strips similar to (W) and (W) arranged around the piston (K) as shown at Figs. 2, 3, and 8. Each of said strips is made in the form of a right angle and they are laid in two rows. The ends of each strip are cut at any suitable angle and at the four connecting points of said ends we provide corner pieces similar to (W$^2$) as represented in Fig. 8. Said strips (W) are seated or otherwise fitted into recesses or channels similar to (U') formed in the metal part of the piston drum (S) as illustrated at Figs. 14 and 15. Said strips engage the front and rear faces as also the sides of the piston (K) and in order to press said strips (W) against the faces and sides there are springs similar to (X) arranged two for each of said faces and sides of the piston as shown at Fig. 8.

(Z) and (Z) are two metal strips fitted one in each of the recessed sides of the piston (K). The ends of said strips engage the eyes (P) of the hinged blocks (N). Three steel springs similar to (Z') are arranged in recesses formed in the ends of the piston drum to press the strips (Z) against the inner faces of the drum so as to effect a steam-tight joint.

(a) is a steam chest cast with or secured to the cylinder (A). Within said chest is arranged the oscillating or semi-rotary valve (b) of any well-known class. This valve is operated by a rod (c) jointed to an arm on shaft (f) to which rod a reciprocating motion is imparted by means of the eccentric (d) secured to the shaft (J). (e) is a door attached to said chest (a).

(f) is a horizontal shaft carried by the two bearings (g).

(h) is a steam-tight gland for the chest (a).

The following method is adopted in order to obtain the bore contour of the cylinder which contour is illustrated at Fig. 16. We take the cylinder and line out the contour by drawing two straight lines (A$^\times$) (B$^\times$) (C$^\times$) (D$^\times$) forming four right angles and intersecting each other at (E$^\times$). From (E$^\times$) as center we describe a circle equal to the determined diameter of the drum (F$^\times$), (G$^\times$), (H$^\times$), (I$^\times$), then upon the line (A$^\times$), (B$^\times$), and from point (E$^\times$) as a center we set off the point (K$^\times$) (L$^\times$) equal to the length of piston determined upon. An arc is then described intersecting (K$^\times$), (G$^\times$), (L$^\times$), then with a proper templet of piston, drum, and rollers, [the templet drum working on center (E$^\times$) with one end of said templet piston following the arc (K$^\times$), (G$^\times$), (L$^\times$),] we describe the differential curve (L$^\times$), (M$^\times$), (K$^\times$) with the other end of said templet piston to complete the contour.

The foregoing method of lining out the bore of the cylinder permits of the size of the drum or the length of the piston being varied. The longer the piston when used with a drum of a given size, so there will be relatively a lesser depth of arc (L$^\times$) (M$^\times$) (K$^\times$); the shorter the piston is made without altering the size of the drum the cylinder will be nearer the form of a circle. The boring of said cylinder is effected by means of a cam arranged upon a spindle centered in a boring lathe. Said cam has a contour which corresponds with the bore of the cylinder but its size is less by one half.

The boring lathe employed carries a compound slide and a face plate to which the cylinder is attached in an ordinary manner. In order to bore said cylinder the screw of the upper slide is removed so that it may be operated and be controlled by means of a metal bar hereinafter described. The lock nut of the leading screw is placed in the latter so as to rigidly secure the saddle or base slide way upon the lathe shears. To said saddle or base slide way of the lathe is affixed a vertical bracket which is of a greater height than the tool rest. One end of the aforesaid straight metal bar is pivoted to the upper end of said bracket while the other end of the bar is jointed to the slide bed carrying the tool rest. Said bar is arranged to bear upon the surface of the cam so that when the latter is rotated said bar will impart an inward and outward movement to the slide rest and boring tool which movement corresponds with the bore contour to be cut or formed in the cylinder.

The principal parts of our engine operate as follows: When live steam is admitted through the inlet (C) and valve (b) it passes through the passage (D) thence into the cylinder (A). After the piston passes the inner end of said inlet (D) a pressure chamber is at once formed between the drum (S) and the rear face of the piston. As the latter reaches the exhaust (D') its upper end passes the inlet (D) and forms a second pressure chamber. The expanded steam in the first pressure chamber then escapes through the exhaust (D') and any steam that may not have escaped will be cushioned after the piston passes the said exhaust; this cushioned steam will escape through the passage D² and pass through the exhaust (D'). As the piston (K) revolves it rotates the drum (S) which is kept steam-tight with the cylinder by means of the strip (L) and as it slides inwardly and outwardly the four rollers (Y) reduce friction thereof to a minimum, while the various springs serve to render the piston (K) steam-tight within the piston drum (S). It will now be seen that the arrangement of the piston is such that it forms two pressure chambers during each revolution of the before-mentioned drum, and, further that each of said chambers becomes of a greater capacity as the piston moves around to the vertical diametrical line of the cylinder to permit of the expansion and exhaustion of steam.

It may be here explained that we construct the cylinder (A), rollers (Y), and intermediate pieces (Q), of cast iron, piston (K) of cast steel, and the hinged blocks (N), and bearings of the rollers of gun-metal.

Having now described our invention, what we claim as new, and desire to secure by Letters Patent, is—

1. The combination, in a rotary steam engine, of the cylinder (A) having the differential curve (L) (M) (K) and the arc (K) (G) (L) formed as the bore contour, the drum (S) with anti-friction rollers (Y), shafts (J) and (J), springs (X) and (X) the sliding piston (K) having at its sides and faces the steam-tight band (W) and (W), with springs (R') (R') and (R²), and at the ends the intermediate pieces (Q), and hinged blocks (N), metal strips (Z) and (Z) and springs (Z') substantially as hereinbefore described and as illustrated in our drawings.

2. In a rotary steam engine, the combination of the cylinder (A) having the steam inlet (C) (D) and exhaust passages (D') and (D²) situated for the expansive working of one induction of steam and the admission of a second induction of steam prior to the opening of the exhaust, the drum (S) in which is contained the sliding piston (K) between anti-friction rollers (Y) and having at its sides the steam-tight band (W) and (W), springs (R') (R') and (R²), and at the ends the intermediate pieces (Q) and hinged blocks (N), substantially as hereinbefore described and as illustrated in our drawings.

3. The combination in a rotary steam engine, of the drum (S) eccentrically arranged within the cylinder (A) the gun metal strip (L) secured in the top of the cylinder bore, springs (M), the flat sliding piston (K) and anti-friction rollers (Y), steam tight band (W) and (W) and springs (R') (R') and (R²), and having at its ends the flanges or disk (T) provided with shafts (J) and (J) arranged through end covers (E) and (F) substantially as hereinbefore described and as illustrated in our drawings.

In witness whereof we have hereunto set our hands in presence of two witnesses.

HARRY WILLIAMS.
THOMAS LANGSTON FISHER.

Witnesses:
REYMARD VARLEY,
ALBERT E. B. SWANSON.